(12) United States Patent
Zhu et al.

(10) Patent No.: US 7,740,960 B1
(45) Date of Patent: Jun. 22, 2010

(54) MULTIFUNCTIONALLY GRADED ENVIRONMENTAL BARRIER COATINGS FOR SILICON-BASE CERAMIC COMPONENTS

(75) Inventors: Dongming Zhu, Westlake, OH (US); Robert A. Miller, Brecksville, OH (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 768 days.

(21) Appl. No.: 11/510,573

(22) Filed: Aug. 28, 2006

Related U.S. Application Data (60) Provisional application No. 60/712,605, filed on Aug. 26, 2005.

(51) Int. Cl.
   *B32B 9/00* (2006.01)
   *F16L 59/00* (2006.01)
(52) U.S. Cl. .................. 428/699; 428/689; 428/697; 428/908.8; 416/241 R; 416/241 B
(58) Field of Classification Search .............. 501/102, 501/126, 152, 5, 27, 103; 428/195.1, 689, 428/697, 699, 908.8
   See application file for complete search history.

(56) References Cited

U.S. PATENT DOCUMENTS

| | | | |
|---|---|---|---|
| 5,687,679 A | 11/1997 | Mullin et al. | |
| 6,444,335 B1 | 9/2002 | Wang et al. | |
| 6,485,848 B1 * | 11/2002 | Wang et al. | 428/697 |
| 6,733,908 B1 | 5/2004 | Lee et al. | |
| 6,740,364 B2 | 5/2004 | Lau et al. | |
| 6,759,151 B1 | 7/2004 | Lee | |
| 6,764,779 B1 | 7/2004 | Liu et al. | |
| 6,812,176 B1 | 11/2004 | Zhu et al. | |
| 7,001,859 B2 | 2/2006 | Zhu et al. | |
| 2002/0045053 A1 | 4/2002 | Hoskin | |
| 2004/0175597 A1 * | 9/2004 | Litton et al. | 428/702 |
| 2005/0142395 A1 * | 6/2005 | Spitsberg et al. | 428/701 |
| 2006/0154093 A1 | 7/2006 | Meschter et al. | |
| 2006/0166016 A1 | 7/2006 | Spitsberg et al. | |
| 2006/0166019 A1 | 7/2006 | Spitsberg et al. | |

* cited by examiner

*Primary Examiner*—Gwendolyn Blackwell
(74) *Attorney, Agent, or Firm*—Edward L. Stolarun; A. David Spevack (57) ABSTRACT

A multilayered coating system consisting of a multicomponent zirconia-base or hafnia-base oxide top layer, an interlayer comprised of a plurality of sublayers and a bond coat layer is provided. The multilayered coating system of the present invention, with an interlayer comprised of a plurality of sublayers, provides a protective coating solution for silicon-base ceramic components exposed to very high temperatures and/or high gas flow velocity water vapor combustion environments. The plurality of sublayers affords for a multitude of interfaces that aid in phonon scattering within the coating system and thereby reduces its thermal conductivity. Furthermore, the plurality of interlayer sublayers afford a strain tolerant buffer between the top layer and substrate and thereby accommodate the thermal expansion mismatch between the oxide top layer (coefficient of thermal expansion (CTE) up to ~$8\text{-}10\times10^{-6}$ m/m-C) and the silicon-base ceramic substrate (CTE≈$4\text{-}5\times10^{-6}$ m/m-C).

33 Claims, 4 Drawing Sheets

Figure 5

US 7,740,960 B1

MULTIFUNCTIONALLY GRADED ENVIRONMENTAL BARRIER COATINGS FOR SILICON-BASE CERAMIC COMPONENTS

RELATED APPLICATION

This application claims priority of U.S. Provisional Patent Application Ser. No. 60/712,605 filed Aug. 26, 2005, which is incorporated herein by reference.

GOVERNMENT INTEREST

The invention described herein may be manufactured, used, and licensed by or for the United States Government.

FIELD OF THE INVENTION

The present invention relates in general to environmental barrier coatings and in particular to multifunctionally graded environmental barrier coatings for silicon-base ceramic components.

BACKGROUND OF THE INVENTION

In hot-sections of gas turbines and other heat engines, high temperature oxidation resistant coatings are necessary to protect engine components and thereby improve engine reliability. Alloyed metallic coatings that form protective, slow growing oxide scales such as alumina ($Al_2O_3$) and chromia ($Cr_2O_3$) have been designed and used as oxidation and corrosion resistant coatings, thus affording for load-bearing components to have longer service lives. However, metallic coatings typically have a useful temperature capability of less than 1000° C., and may melt above 1350° C.

Lightweight and high temperature capable silicon-base ceramics are desirable and can be used for improving gas turbine engine performance. However, thermal and environmental barrier coatings are critical when employing the ceramic technology. The environmental barrier coatings are a necessity in providing thermal and environmental protection of the silicon-base ceramic components due to the high volatility of silicon-base ceramics in high temperature oxidizing and water vapor containing combustion environments. In order to increase the temperature capability of silicon-base ceramic engine components, thermal and environmental barrier coatings are applied to the component surfaces. Thermal and environmental barrier coatings are relatively thin ceramic layers, generally applied by plasma-spraying or physical vapor deposition techniques, that are used to protect metallic and ceramic components from high temperature gases, water vapor and other oxidants. Such coatings are useful in protecting and extending the service lives of ceramic components exposed to high temperatures, such as jet engine turbine blades, vanes and combustors.

Outer layer thermal barrier coatings composed of zirconia-yttria are well known in the art, wherein the yttria is typically present from 7 to 9 weight percent (wt %) (4 to 5 molar percent). The coatings are generally applied by plasma-spraying or physical vapor deposition, in which melted ceramic particles or vaporized ceramic clouds are deposited onto the surface of a component to be protected, and have been widely used in more advanced engine systems. The thermal barrier coatings are somewhat porous with overall porosities typically in the range of 5 to 20 percent. The porosity serves to reduce the thermal conductivity of the coating below the intrinsic conductivity of the dense ceramic of the same composition.

Beneath an outer layer thermal barrier coating, it is not uncommon for a coating system to have an intermediate layer plus and a bond coat adjacent to the substrate. The intermediate layer can be referred to as an environmental barrier coating. Current state-of-the-art environmental barrier coatings for silicon-base ceramics are based on barium strontium aluminosilicate (BSAS), with a mullite+BSAS intermediate layer, and a silicon bond coat adjacent to the silicon-base ceramics. One problem with current environmental barrier coatings is the limited high temperature stability, and thus capability, of such systems. These barrier coatings have a temperature capability of 1350° C. and below due to the: (1) relatively poor water vapor corrosion resistance of the coating below 1300° C.; and (2) low melting eutectic glass phases resulting from silicon interdiffusion and interface reactions in the mullite+BSAS/silicon system. Therefore, an environmental barrier coating with high water vapor stability and high temperature capability is needed.

SUMMARY OF THE INVENTION

A multilayered coating system comprised of a multicomponent zirconia-base or hafnia-base oxide top layer, a plurality of sublayers and a bond coat layer is provided. The multilayered coating system of the present invention, with an interlayer comprised of a plurality of sublayers, provides a protective coating solution for silicon-base ceramic components exposed to very high temperatures and/or high gas flow velocity water vapor containing combustion environments. The plurality of sublayers affords for a multitude of interfaces that aid in phonon scattering and a subsequent reduction in thermal conductivity within the coating system. Furthermore, the plurality of interlayer sublayers afford a strain tolerant buffer between the top layer and substrate, and thereby accommodate the thermal expansion mismatch and thermal strains between the oxide top layer (coefficient of thermal expansion (CTE) up to ~8-10×10$^{-6}$ m/m-C) and the silicon-base ceramic substrate (CTE≈4-5×10$^{-6}$ m/m-C). In the alternative, a multilayered coating system comprised of the plurality of sublayers and a bond coat layer is provided for protection of silicon-base ceramic components.

DESCRIPTION OF THE PREFERRED EMBODIMENTS

A multilayered coating system comprised of a multicomponent zirconia-base or hafnia-base oxide top layer, an interlayer comprised of a plurality of sublayers and a bond coat layer is provided. The multilayered coating system of the present invention, with an interlayer comprised of a plurality of sublayers, provides a protective coating solution for silicon-base ceramic components exposed to very high temperatures and/or high gas flow velocity water vapor containing combustion environments. The plurality of sublayers affords for a multitude of interfaces that aid in phonon scattering and a subsequent reduction in thermal conductivity within the coating system. Furthermore, the plurality of interlayer sublayers afford a strain tolerant buffer between the top layer and substrate and thereby accommodate the thermal expansion mismatch between the oxide top layer (coefficient of thermal expansion (CTE) as high as ~8-10×10$^{-6}$ m/m-C) and the silicon-base ceramic substrate (CTE≈4-5×10$^{-6}$ m/m-C). In the alternative, a multilayered coating system comprised of the plurality of sublayers and a bond coat layer is provided for protection of silicon-base ceramic components.

Figure 1:
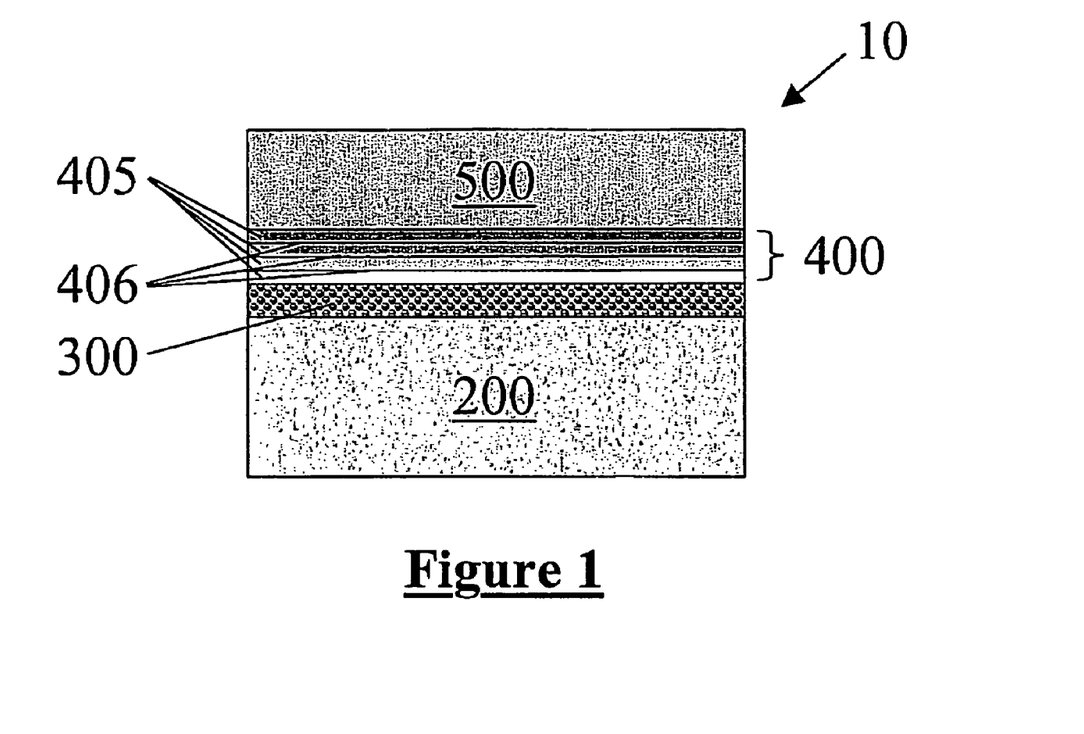
FIG. 1 is an illustration of a first embodiment of the present invention.

A first embodiment of the present invention is illustratively shown in FIG. 1 at 10. The multilayered coating system is applied to a substrate 200. External to the bond coat 300, is an interlayer 400 with an outer layer 500 thereupon. The substrate 200 is a silicon-base ceramic used in high temperature applications, illustratively including silicon carbide (SiC), silicon nitride ($Si_3N_4$) and silicon-base continuous fiber reinforced ceramic matrix composites (e.g. SiC/SiC CMCs). The bond coat 300 in contact with the substrate 200 is comprised of any suitable material, illustratively including silicon, mullite, mullite+silicon, mullite+barium strontium aluminosilicate (BSAS), doped mullite or other high-stability metal oxide composite systems (e.g. $HfO_2$+silicon and/or $ZrO_2$+silicon). In the alternative, bond coat 300 can be comprised of a rare earth silicate, illustratively including yttrium silicates ($Y_2Si_2O_7$, $Y_2SiO_5$), ytterbium silicates ($Yb_2Si_2O_7$, $Yb_2SiO_5$), gadolinium silicates ($Gd_2Si_2O_7$, $Gd_2SiO_5$), erbium silicates ($Er_2Si_2O_7$, $Er_2SiO_5$) and combinations thereof.

The term mullite as used in the present invention is defined as an aluminosilicate material commonly denoted as $3Al_2O_3$-$2SiO_2$. The term doped mullite as used in the present invention is defined as mullite alloyed with other elements or oxides. The doped mullite can be mullite alloyed with the oxides of rare earth elements scandium, yttrium, cerium, neodymium, samarium, europium, gadolinium, dysprosium, erbium and combinations thereof, along with oxides of transition metal elements hafnium, tantalum, titanium, zirconium and combinations thereof. When bond coat 300 is comprised of a high stability metal oxide composite, the metal oxide, e.g. $HfO_2$ of the $HfO_2$+silicon composite or $ZrO_2$ of the $ZrO_2$+silicon composite, can be doped or undoped. Doped $HfO_2$ and doped $ZrO_2$ are taught in more detail in the following sections.

The concentration of BSAS in a mullite+BSAS bond coat 300 ranges from 10 to 30 molar percent (mol %). The concentration of silicon in the mullite ranges from 0 to 25 vol %, preferably ranges from 1 to 15 vol % and more preferably ranges from 2 to 12 vol %. The concentration of yttrium oxide, gadolinium oxide and ytterbium oxide in the doped mullite each range from 0.5 to 10 mol %, and preferably each range from 1 to 8 mol %. The concentration of hafnium oxide in the doped mullite ranges from 0 to 60 mol %, preferably ranges from 1 to 30 mol % and more preferably ranges from 2 to 12 mol %. These advanced bond coats afford maximum high temperature capability and adhesion for thermal barrier coatings systems.

Interlayer 400 is comprised of a plurality of sublayers 405 wherein each sublayer has a different chemical composition. The sublayers 405 in the present embodiment can be comprised of mullite, mullite+silicon, mullite+BSAS, doped mullite, high-stability metal oxides composite system or a rare earth silicate, wherein the thermodynamic activity of silicon within a given sublayer 405 is less than the thermodynamic activity of silicon in the adjacent sublayer 405 that is nearer in distance to the bond coat 300. In other words, the activity of silicon increases within each sublayer that is closer to bond coat 300. The type and concentration of a given sublayer 405 is the same as taught above for bond coat 300.

Between each sublayer is an interface 406. It is well known to those skilled in the art that interfaces within a given material or coating system aid in the scattering of phonons, which in turn reduces thermal conductivity. Therefore, interlayer 400 with its associated interfaces 406 aids in the scattering of phonons and the subsequent reduction of thermal conductivity in the coating. In addition, the plurality of sublayers 405 and the interfaces 406 therebetween, afford a strain tolerant buffer between the outer layer 500 and the substrate 200, thereby accommodating the thermal expansion mismatch and thermal strains between said outer layer and substrate. The strain tolerant buffer is particularly important when large thermal gradients are present within the coating system.

The outer layer 500 can be comprised of a current state-of-the art thermal barrier coating material, illustratively including $ZrO_2(HfO_2)$-8 wt % $Y_2O_3$. In the alternative, outer layer 500 can be comprised of undoped $HfO_2$ or a four-component low conductivity high toughness (LCHT) thermal barrier coating. The doped $HfO_2$ and doped $ZrO_2$ mentioned above can be comprised of the four-component LCHT thermal barrier coating, which has a partially stabilized non-transformable tetragonal t' structure that emphasizes higher total dopant content than a cubic structured system. In addition to the four-component system, the present invention affords a four-component LCHT outer layer 500 with two additional paired transition metal oxide toughening dopants included therein as disclosed in copending utility U.S. patent application Ser. No. 11/510,574 entitled "Low Conductivity And High Toughness Tetragonal Phase Structured Ceramic Thermal Barrier Coatings" filed concurrently herewith and included herein by reference. The LCHT outer layer 500 can also be alloyed with aluminosilicates (e.g. doped or undoped mullite) or aluminates. Alloying with aluminosilicates and/or aluminates affords a reduction in the LCHT outer layer 500 thermal expansion coefficient while maintaining high temperature thermal stability.

The four-component LCHT coating system upon which outer layer 500 is based, includes a base oxide selected from a group consisting of zirconia ($ZrO_2$), hafnia ($HfO_2$) and combinations thereof. A primary stabilizer dopant, comprising a second component, is selected from the group of rare earth oxides consisting of yttria ($Y_2O_3$), dysporia ($Dy_2O_3$), euria ($Eu_2O_3$) and combinations thereof. The third and fourth components are comprised of cluster dopant oxides that promote the formation of extended defects and defect clusters which aid in the reduction of the oxide intrinsic thermal conductivity and sintering rates. The third component cluster dopant oxide is selected from a group of rare earth oxides which has a smaller ionic size than the primary stabilizer component and/or the base oxide component. This group of small rare earth oxides is selected from the oxides of ytterbium, holmium, lutetium and combinations thereof. The fourth component cluster dopant oxide is selected from a group of rare earth oxides which has a larger ionic size than the primary stabilizer component and/or the base oxide component. This group of large rare earth oxides is comprised of an oxide of neodymium, samarium, europium, gadolinium and combinations thereof.

The two additional paired transition metal oxide toughening dopants include oxides of titanium (e.g. $TiO_2$), tantalum (e.g. $Ta_2O_3$), niobium (e.g. $Nb_2O_5$), scandium (e.g. $Sc_2O_3$) and combinations thereof can be added. Thus one embodiment of the present invention is a multilayered coating system with a six-component thermal barrier coating outer layer 500 illustrated by:

$$ZrO_2(HfO_2)—Y_2O_3(Dy_2O_3)(Eu_2O_3)—RE_2O_3(A)-RE_2O_3(B)—TiO_2(Nb_2O_3)(Sc_2O_3)—Ta_2O_5(Nb_2O_3)(Sc_2O_3)$$

where $RE_2O_3(A)$ and $RE_2O_3(B)$ are Group A and Group B rare earth oxide dopants, respectively. The doped $HfO_2$ and doped $ZrO_2$ mentioned above can also be comprised of this six-component system. Group A and Group B are equivalent to the third component cluster dopant oxide and fourth component cluster dopant oxide described above, respectively. The total dopant oxide composition in the outer layer 500 is from 3 to 26 molar percent (mol %). Preferably, the total dopant oxide composition ranges from 5 to 22 mol %. More preferably, the total dopant oxide composition ranges from 10 to 20 mol %. The composition range of the primary stabilizer dopant is from 1 to 10 mol %. Preferably the composition range of the primary stabilizer dopant is between 2 and 8 mol % and even more preferably the composition range is between 2 and 6 mol %. The composition of the Group A and Group B rare earth oxide dopants each range from 0.5 to 4 mol %, and preferably range from 1 to 3 mol %. It is also preferred, but not required, that Group A and Group B rare earth oxides are present in equal molar amounts. The total concentration of the transition metal toughening dopants ranges from 1 to 20 mol % whereas the total concentration of the primary stabilizer dopant, Group A dopant and Group B dopant is preferably in the range of 1 to 12 mol %, and more preferably in the range of 2 to 10 mol %. The range of total concentration for the primary stabilizer dopant, Group A dopant and Group B dopant is necessary to ensure the formation and stabilization of the tetragonal phase structured coating.

Another embodiment of the present invention is comprised of outer layer 500 having transition metal toughening dopants $TiO_2$ and $Ta_2O_5$ incorporated into a four-component low conductivity composition which initially has a cubic phase structure. In the alternative, $Nb_2O_3$, $Sc_2O_3$ and combinations thereof can be used to substitute for the $TiO_2$ and/or $Ta_2O_5$, or used as dopants in the $TiO_2$ and/or $Ta_2O_5$. The incorporation of the transitional metal toughening dopants enhances the coating erosion and toughness performance. In the present embodiment the total concentration of primary stabilizer dopant, Group A dopant and Group B dopant is in the range of 7 to 20 mol %.

The addition of the Group A dopant, Group B dopant, and the toughening oxide dopants to the zirconia (hafnia)-yttria or other zirconia (hafnia) base systems serves three functions. The first function is the creation of thermodynamically stable, highly defective lattice structures with controlled ranges of defect cluster sizes. The intent of these complex structures is to effectively attenuate and scatter lattice phonon waves as well as radiative photon waves at a wide spectrum of frequencies. This scattering significantly reduces the oxide intrinsic lattice and radiation thermal conductivity. The second function is the production of highly distorted lattice structures with relatively immobile defect clusters and/or nanoscale ordered phases. These clusters and phases effectively reduce the mobile defect concentration and suppress the atomic mobility and mass transport. This second function significantly improves the oxide sintering-creep resistance of the coating system. The third function is the improvement of the mechanical properties of the coating system, such as fracture toughness and durability, and results from the formation of complex nanoscale defect clusters.

The functions mentioned above are derived from the consideration of lattice elastic strain energy and ionic sizes, electroneutrality conditions and oxide free energy of formation. Regarding lattice elastic strain energy and ionic size considerations, one or more pairs of additional dopants incorporated into zirconia (hafnia) coating systems effectively produce lattice distortions in the ceramic alloy solid solutions and facilitate local ionic segregation, commonly known as defect clustering to those skilled in the art. With respect to the electroneutrality consideration, one or more pairs of additional dopants incorporated into the base oxides have cation valencies that are either less than that of zirconia or larger than that of zirconia. These dopants create a high concentration of highly associated defects which create strong dopant-oxygen vacancies and dopant-dopant interactions, both of which promote the formation of extended, immobile defect clusters. Regarding an oxides free energy of formation, a high free energy of formation for a dopant oxide represents a high stability of the oxide in an oxygen-containing atmosphere. The high free energy of formation also correlates with high polarization of the oxide which further introduces lattice defects and distortion, both of which result in a reduced thermal conductivity and an improved sintering creep resistance. One further consideration is the atomic weight and solubility of the dopant oxides. A high dopant atomic weight is beneficial for improving lattice scattering. Furthermore, a high dopant solubility is beneficial for increasing dopant concentrations and thus defect concentrations. A mixture of high solubility and low solubility dopants of high and low atomic weight promote complex structures and thus improved lattice scattering. Yet another embodiment of the present invention affords a multilayer coating system comprised of a bond coat 300 and interlayer 400 only, i.e. outer layer 500 is not present.

Figure 2:
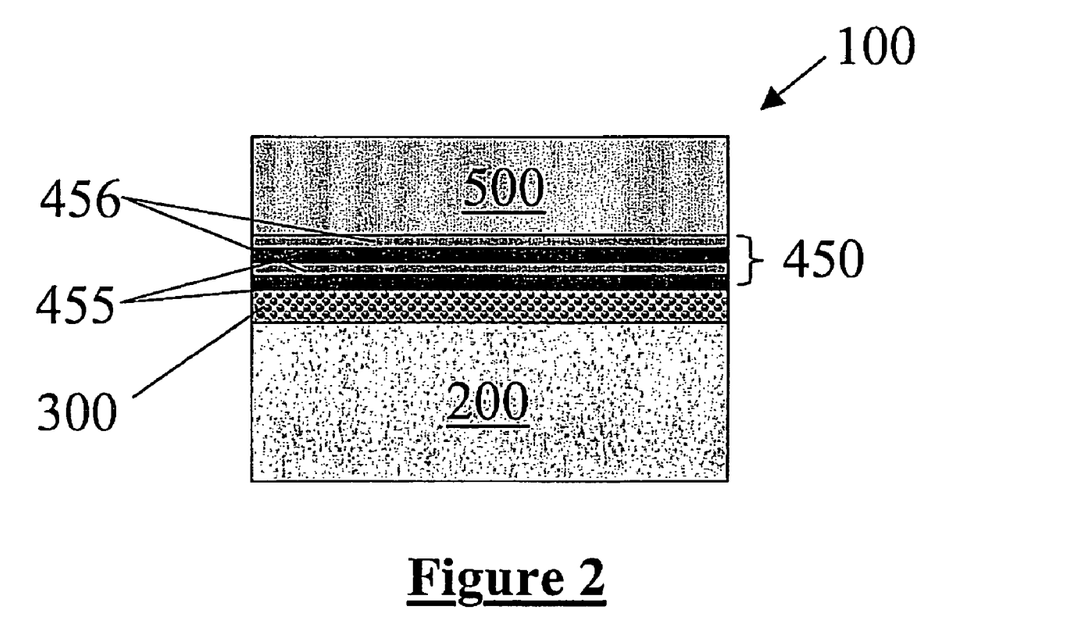
FIG. 2 is an illustration of second embodiment of the present invention.

A second embodiment of the present invention is illustratively shown in FIG. 2 at 100. The multilayered coating system is applied to substrate 200. External to bond coat 300 is an interlayer 450 with outer layer 500 thereupon.

Interlayer 450 is comprised of a plurality of sublayers 455 and 456 wherein the sublayers afford for at least two alternating sets of chemically distinct layers. A first set of the alternating layers 455 is comprised of a rare earth oxide doped transition metal oxide selected from the group consisting of an oxide of hafnium, zirconium and combinations thereof. The rare earth oxide dopant can be varied depending upon the composition and/or phase structure of the substrate 200 and outer layer 500. For illustrative purposes only, the rare earth oxide dopant can be selected from the group consisting of oxides of yttrium, ytterbium, holmium, lutetium, neodymium, samarium, europium, gadolinium, and combinations thereof. A second set of alternating layers 456 is comprised of an aluminosilicate material and selected from the same types and compositions as bond coat 300 and sublayer 405 as described above.

By alternating chemically distinct layers, interfaces between the sublayers 455 and 456 aid in the thermal conductivity reduction of the coating system as described above. Furthermore, the plurality of sublayers 455 and 456 and the interfaces therebetween afford for a strain tolerant buffer between the outer layer 500 and the substrate 200, thereby accommodating the thermal expansion mismatch and thermal strains between said outer layer and said substrate.

The present invention can also be comprised of more than two sets of alternating chemically distinct layers, for example three sets, four sets, etc. of alternating chemically distinct layers. In addition, a third type of chemically distinct layer can be inserted within interlayer 450. For example, and for illustrative purposes only, a rare earth silicate sublayer can be inserted within an interlayer 450 comprised of alternating sets of doped mullite sublayers and doped $HfO_2$ sublayers. The location of a third type of chemically distinct layer can be between the bond coat 300 and the interlayer 450, between the outer coat 500 and the interlayer 450, and/or in between a sublayer 455 and sublayer 456.

In order to demonstrate the effectiveness and yet in no way limit the scope of the present invention, two examples are given below.

Example 1

Figure 3:
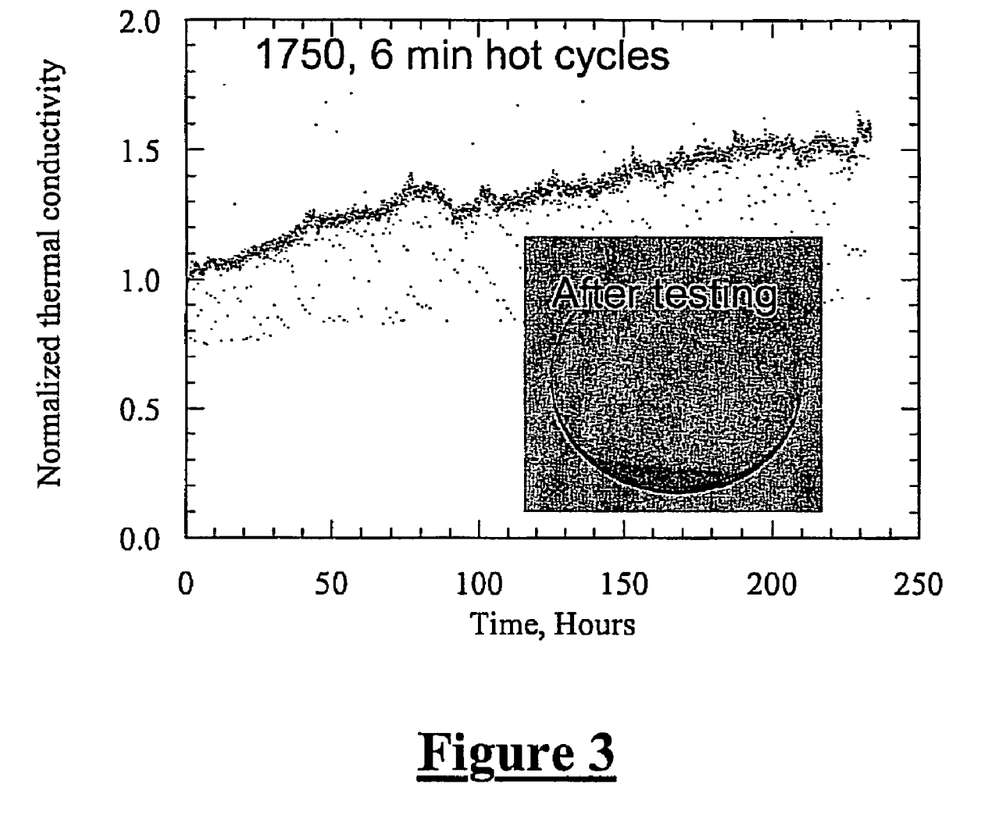
FIG. 3 is a graphical representation of the normalized thermal conductivity as a function of test time for a sample coated in accordance with the first embodiment of the present invention.

A sample incorporating an interlayer 400 comprised of multiple layers of doped mullite wherein the silicon activity of each layer decreased in a direction from the outer layer 500 to the bond coat 300 was prepared. The substrate 200 was a silicon-base ceramic and the bond coat 300 was comprised of doped mullite. The outer layer 500 was a $HfO_2$—$RE_2O_3$ thermal barrier coating. FIG. 3 shows a graphical representation of the normalized thermal conductivity as a function of test time wherein said sample was cyclically tested at 1750° C. using 6 minute hot cycles. The normalized thermal conductivity is used to evaluate the delamination behavior of a coating. As shown in this figure, the normalized thermal conductivity for a multilayer coating system according to the present invention demonstrates a relatively smooth continuous increase with test time. FIG. 3 also shows an inset photograph of the sample after testing, wherein the coating is still intact.

Example 2

Figure 4:
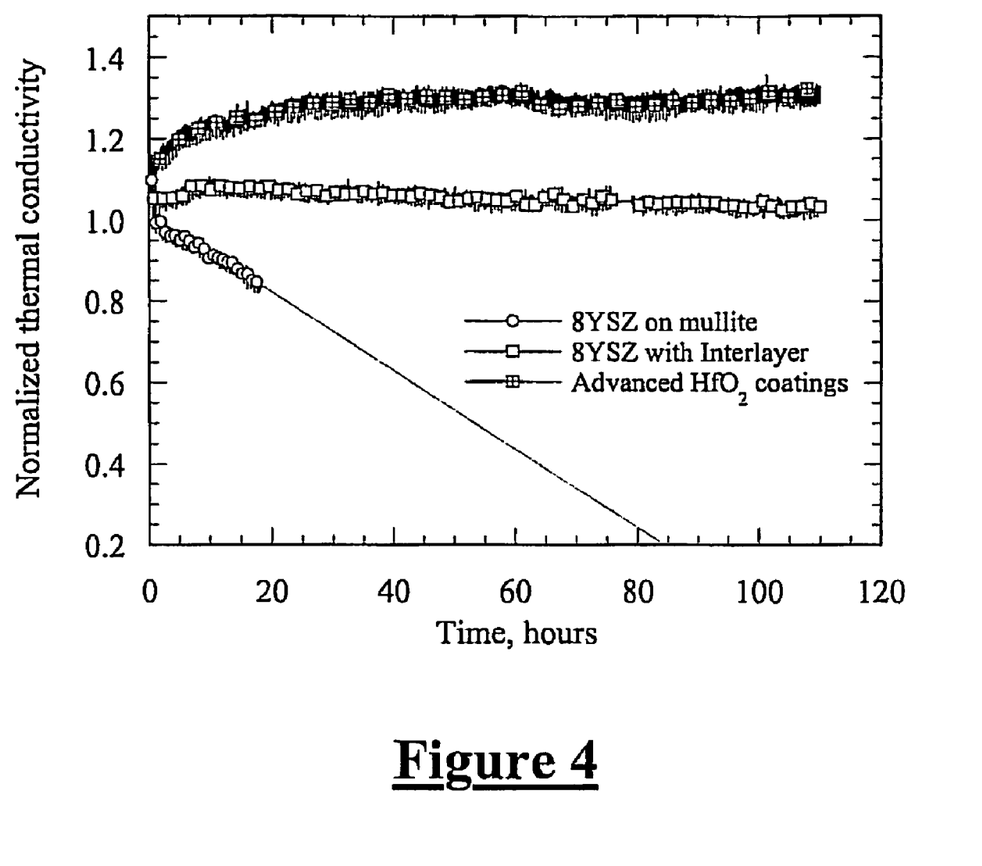
FIG. 4 is a graphical representation of the normalized thermal conductivity as a function of test time for a sample coated in accordance with the second embodiment of the present invention.
Figure 5:
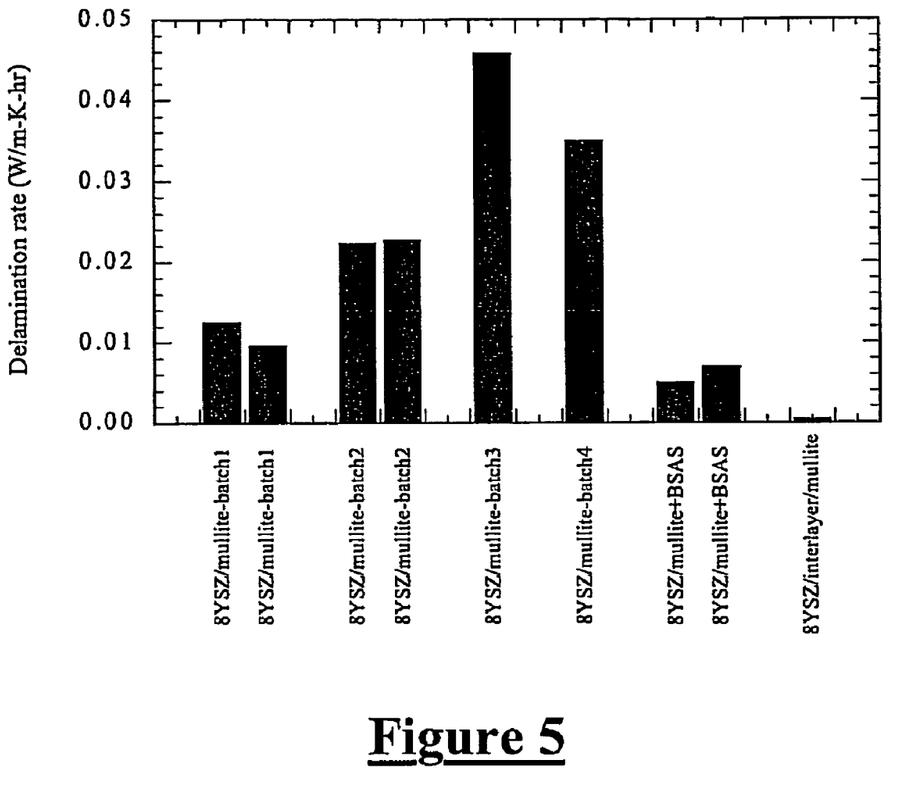
FIG. 5 is a graphical representation of the delamination rate of a sample coated in accordance with the second embodiment of the present invention.

Samples manufactured according to the second embodiment of the present invention were also prepared. The substrate 200 was a silicon-base ceramic and the bond coat 300 was comprised of doped mullite. The interlayer 450 was comprised of alternating sets of $HfO_2$-27 wt % $Y_2O_3$ sublayers and mullite sublayers (shown as "Advanced $HfO_2$ coatings" in FIG. 4). The samples had at least five sublayers of mullite in between which were at least five layers of $HfO_2$-27 wt % $Y_2O_3$. The thickness of the mullite sublayers was at least 10 microns whereas the thickness of the $HfO_2$-27 wt % $Y_2O_3$ sublayers was at least 5 microns. The outer layer 500 was comprised of a current state-of-the-art $ZrO_2$-8 wt % $Y_2O_3$ thermal barrier coating in order to demonstrate the effectiveness of the interlayer 450. These samples, along with samples with a $ZrO_2$-8 wt % $Y_2O_3$/mullite interlayer system (shown as "8YSZ with Interlayer") and a traditional $ZrO_2$-8 wt % $Y_2O_3$ thermal barrier coating on a mullite bond coat (shown as "8YSZ on mullite") were tested at 1605° C. FIG. 4, illustrates the normalized thermal conductivity as a function of test time for the samples tested and provides a comparison of the delamination resistance of each coating system. Clearly, the advanced hafnia/mullite interlayer coating system has a significantly higher delamination resistance than traditional thermal barrier coatings. This observation is confirmed in FIG. 5 wherein a marked reduction in the delamination rate is illustrated for samples with a simple $ZrO_2$-8 wt % $Y_2O_3$/mullite interlayer system compared to a current state-of-the-art $ZrO_2$-8 wt % $Y_2O_3$ coatings on a mullite and a mullite+BSAS bond coat system.

In addition to the above-described embodiments, environmental protection coating encapsulated nano-silicon, nano-alumino-silicate and/or rare earth-silicate particles can be utilized for self-monitoring and self-healing applications. The alternating compositional layer coatings can range in thickness from 5 to 50 microns and from 2 to 20 layers for each composition.

The foregoing description is illustrative of particular embodiments of the invention, but is not meant to be a limitation upon the practice thereof. The following claims, including all equivalents thereof, are intended to define the scope of the invention.

The invention claimed is:

1. A multilayer article comprising:
   a substrate;
   a bond coat in contact with said substrate, said bond coat selected from the group consisting of, mullite doped with gadolinium oxide, mullite doped with yttrium oxide, mullite doped with ytterbium oxide, mullite doped with zirconium oxide and combinations thereof; and
   an interlayer comprised of a plurality of sublayers external to said bond coat, said sublayers comprised of chemically distinct layers wherein the thermodynamic activity of silicon within each sublayer is not equal to the thermodynamic activity of silicon in an adjacent sublayer, said plurality of sublayers selected from the group consisting of mullite doped with silicon, mullite doped with hafnium oxide, mullite doped with gadolinium oxide, mullite doped with yttrium oxide, mullite doped with ytterbium oxide, mullite doped with zirconium oxide, mullite doped with rare earth silicates and combinations thereof.

2. A multilayer article of claim 1, further comprising a thermal barrier coating outer layer external to said interlayer.

3. The multilayer article of claim 1, wherein the substrate is a silicon-base ceramic selected from the group consisting of silicon carbide, silicon nitride, silicon carbide/silicon carbide ceramic matrix composites and combinations thereof.

4. The multilayer article of claim 1, wherein said bond coat also includes material selected from the group consisting of, hafnium oxide+silicon, zirconium oxide+silicon and combinations thereof.

5. The multilayer article of claim 1, wherein the yttrium oxide in said doped mullite is present from 0.5 to 10 molar percent.

6. The multilayer article of claim 1, wherein the zirconium oxide in said doped mullite is present from 1 to 60 molar percent.

7. The multilayer article of claim 1, wherein the thermodynamic activity of silicon within any given sublayer is less than the thermodynamic activity of silicon within the adjacent sublayer nearer in distance to said bond coat.

8. The multilayer article of claim 1, wherein the gadolinium oxide in said doped mullite is present from 0.5 to 10 molar percent.

9. The multilayer article of claim 1, wherein the ytterbium oxide in said doped mullite is present from 0.5 to 10 molar percent.

10. The multilayer article of claim 2, wherein said outer layer is comprised of an oxide selected from the group consisting of an oxide of zirconium, hafnium and combinations thereof.

11. The multilayer article of claim 2, wherein said outer layer is comprised of a base majority component selected from the group consisting of an oxide of zirconium, hafnium and combinations thereof;

a first dopant oxide selected from the group consisting of an oxide of yttrium, dysprosium, erbium and combinations thereof, said dopant oxide present from 1 to 10 molar percent;

at least one small rare earth oxide selected from the group consisting of an oxide of ytterbium, holmium, lutetium and combinations thereof, said small rare earth oxide present from 0.5 to 4 molar percent;

at least one large rare earth oxide selected from the group consisting of an oxide of neodymium, samarium, europium, gadolinium and combinations thereof, said large rare earth oxide present from 0.5 to 4 molar percent; and at least one toughening oxide selected from the group consisting of an oxide of titanium, tantalum, niobium, scandium, and aluminosilicates, and combinations thereof, said toughening oxide and silicate present from 1 to 20 molar percent.

12. The multilayer article of claim 11, wherein said outer layer has a tetragonal crystallographic phase structure.

13. The multilayer article of claim 11, wherein said outer layer has a cubic crystallographic phase structure.

14. The multilayer article of claim 11, wherein said outer layer has a thermal conductivity of less than 2.0 W/m-K.

15. The multilayer article of claim 11, wherein said outer layer has a defect cluster and nano-composite grain size from 5 to 100 nanometers.

16. A multilayer article comprising:

a substrate comprised of a silicon-base ceramic selected from the group consisting of silicon carbide, silicon nitride, silicon carbide/silicon carbide ceramic matrix composites and combinations thereof;

a bond coat in contact with said substrate, said bond coat selected from the group consisting of, mullite doped with gadolinium oxide present from 0.5 to 10 molar percent, mullite doped with yttrium oxide present from 0.5 to 10 molar percent, mullite doped with ytterbium oxide present from 0.5 to 10 molar percent and combinations thereof;

an interlayer comprised of a plurality of sublayers external to said bond coat, said sublayers comprised of chemically distinct layers wherein the thermodynamic activity of silicon within any given sublayer is less than the thermodynamic activity of silicon in an adjacent sublayer nearer in distance to said bond coat, said plurality of sublayers selected from the group consisting of, mullite doped with gadolinium oxide present from 0.5 to 10 molar percent, mullite doped with yttrium oxide present from 0.5 to 10 molar percent, mullite doped with ytterbium oxide present from 0.5 to 10 molar percent and combinations thereof; and a thermal barrier coating outer layer, said outer layer comprised of a base majority component, a first dopant oxide, at least one small rare earth oxide, at east one large rare earth oxide and at least one toughening oxide;

said base majority component selected from the group consisting of an oxide of zirconium, hafnium and combinations thereof;

said first dopant oxide selected from the group consisting of an oxide of yttrium, dysprosium, erbium and combinations thereof, said dopant oxide present from 1 to 10 molar percent;

said at least one small rare earth oxide selected from the group consisting of an oxide of ytterbium, holmium, lutetium and combinations thereof, said small rare earth oxide present from 0.5 to 4 molar percent;

said at least one large rare earth oxide selected from the group consisting of an oxide of neodymium, samarium, europium, gadolinium and combinations thereof, said large rare earth oxide present from 0.5 to 4 molar percent; and said at least one toughening oxide selected from the group consisting of an oxide of titanium, tantalum, niobium, scandium and combinations thereof, said toughening oxide present from 1 to 20 molar percent.

17. The multilayer article of claim 16, wherein said bond coat further includes a material selected from the group consisting of hafnium oxide+silicon, zirconium oxide+silicon and combinations thereof.

18. A multilayer article comprising:

a substrate;

a bond coat in contact with said substrate, said bond coat having a controlled nano-structure containing mullite; and an interlayer comprised of a plurality of sublayers external to said bond coat, said sublayers comprised of at least two alternating sets of chemically distinct layers.

19. The multilayer article of claim 18 further comprising a thermal barrier coating outer layer external to said interlayer.

20. The multilayer article of claim 18, wherein the substrate is a silicon-base ceramic selected from the group consisting of silicon carbide, silicon nitride, silicon carbide/silicon carbide ceramic matrix composites and combinations thereof.

21. The multilayer article of claim 18, wherein said bond coat is selected from the group consisting of mullite, mullite doped with barium strontium aluminosilicate, mullite doped with silicon, mullite doped with hafnium oxide, mullite doped with gadolinium oxide, mullite doped with yttrium oxide, mullite doped with ytterbium oxide and combinations thereof.

22. The multilayer article of claim 18, wherein one set of said alternating sublayers is a rare earth oxide doped transition metal oxide selected from the group consisting of an oxide of hafnium, zirconium and combinations thereof, and a second set of said alternating sublayers is selected from the group consisting of mullite, mullite doped with hafnium oxide, mullite doped with titanium oxide, mullite doped with tantalum oxide and combinations thereof.

23. The multilayer article of claim 22, wherein said rare earth oxide dopant is selected from the group consisting of an oxide of scandium, yttrium, cerium, neodymium, samarium, europium, gadolinium, dysprosium, erbium, ytterbium and combinations thereof.

24. The multilayer article of claim 18, wherein the total number of sublayers is greater than three.

25. The multilayer article of claim 18, wherein the thickness of each sublayer is between 1 micron and 50 microns.

26. The multilayer article of claim 18, wherein the thickness of each sublayer is between 5 micron and 20 microns.

27. The multilayer article of claim 18, wherein said outer layer is comprised of a base majority component selected from the group consisting of an oxide of zirconium, hafnium and combinations thereof;

a first dopant oxide selected from the group consisting of an oxide of yttrium, dysprosium, erbium and combinations thereof, said dopant oxide present from 1 to 10 molar percent;

at least one small rare earth oxide selected from the group consisting of an oxide of ytterbium, holmium, lutetium and combinations thereof, said small rare earth oxide present from 0.5 to 4 molar percent;

at least one large rare earth oxide selected from the group consisting of an oxide of neodymium, samarium, europium, gadolinium and combinations thereof, said large rare earth oxide present from 0.5 to 4 molar percent; and at least one toughening oxide selected from the group consisting of an oxide of titanium, tantalum, niobium, scandium, aluminosilicates and combinations thereof, said toughening oxide and silicate present from 1 to 20 molar percent.

28. The multilayer article of claim 27, wherein said outer layer has a cubic crystallographic phase structure.

29. The multilayer article of claim 27, wherein said outer layer has a tetragonal crystallographic phase structure.

30. The multilayer article of claim 27, wherein said outer layer has a thermal conductivity of less than 2.0 W/m-K.

31. The multilayer article of claim 27 wherein said outer layer has a defect cluster and nano-composite grain size from 5 to 100 nanometers.

32. The multilayer article of claim 11, wherein said outer layer has a nano-cluster and nano-composite microstructure.

33. The multilayer article of claim 19, wherein said outer layer has a nano-composite microstructure.

* * * * *